June 23, 1931. C. W. LANDERS 1,811,180
COMMUTATOR CONSTRUCTION FOR ELECTRIC MACHINES
Filed Oct. 26, 1928
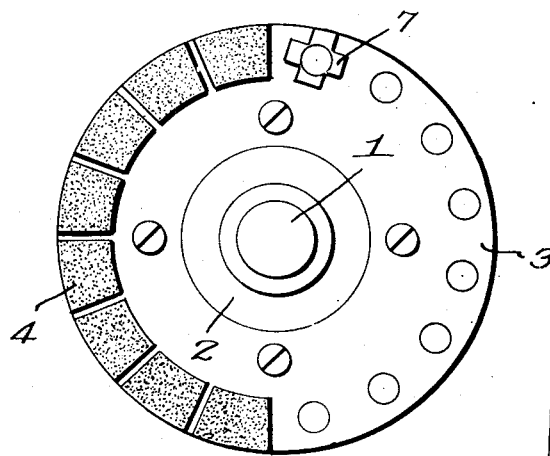
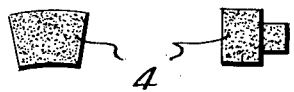
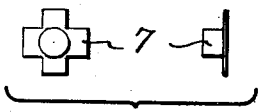
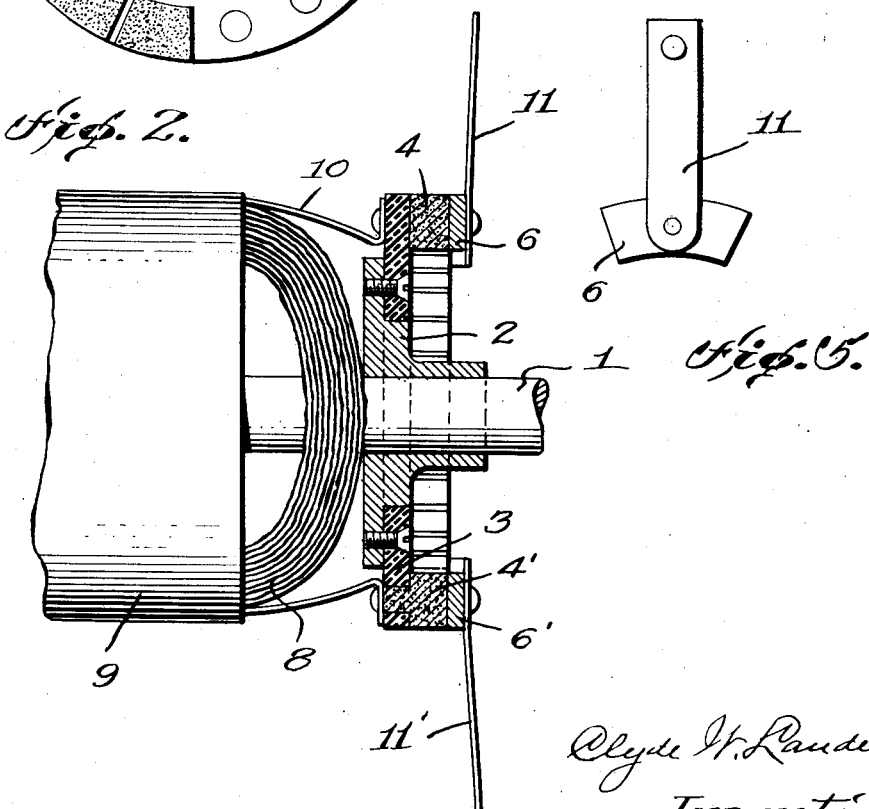
Clyde W. Landers,
Inventor Patented June 23, 1931

1,811,180

UNITED STATES PATENT OFFICE

CLYDE W. LANDERS, OF NEW YORK, N. Y.

COMMUTATOR CONSTRUCTION FOR ELECTRIC MACHINES

Application filed October 26, 1928. Serial No. 315,262.

This invention relates to improvements in the construction of commutators for electric machines.

One object of this invention is an improved commutator.

Another object of this invention is to provide suitable resistance in the circuit during the period when the armature coils are short circuited by the brushes.

Another object of this invention is to provide a commutator and brush arrangement that will have unusually long life and keep clean.

Another object of this invention is to provide an armature and commutator construction in which the commutator can be easily and practically renewed when necessary.

Another object of this invention is to eliminate the use of copper and mica in commutator construction.

Another object of this invention is to provide a commutator that will not short circuit the armature coils and burn them.

Another object of this invention is to provide a commutator and brush construction in which the carbon or soft element revolves and is subject to wear only a portion of the time, while the copper or hard element is stationary and is subject to wear all the time.

In accordance with this invention, the commutator is made in the form of a disc, composed of a metal frame firmly mounted on the armature shaft, and the frame supports a suitable washer made of any insulating material, but preferably a material known as "transite" a heat resisting composition.

Near the periphery of this "transite" washer is a series of holes in which are inserted the rounded portion of the carbon segments which form the commutator. In order to connect the armature conductors to the carbon segments thin copper thimbles or strips are first inserted in the holes, and the carbon then forced tightly into the copper thimbles. The wire leads from the armature winding are then soldered to the exposed copper thimbles on the side opposite the carbon segment.

The carbon segments are separated from each other slightly forming an "air gap" which also produces a slight circulation of the air in the motor due to the "fan effect."

Standard practice has long been to provide a copper commutator with carbon or similar brushes in contact with it that wear away faster than the commutator, thus causing frequent renewal of the brushes. With my improved construction it will be noted that the carbon segments of the commutator are subject to wear only a small part of the time, or while passing in contact with the copper shoes that function the same as brushes.

Special attention is called to the fact that although I use carbon and copper in combination with each other, to secure commutation which is old in the art, by rearranging these two elements as shown in the drawings, new and better results are secured and the life of the elements greatly increased.

This construction eliminates practically all brush and commutator trouble that has always existed in electric machines, and prolongs the life of these elements almost indefinitely.

In the drawings, comprising but a single sheet, five figures, one form of my improved commutator construction is set forth.

Figure 1 is a front view of a commutator showing one form of my invention.

Figure 2 is a view partly in section taken through the shaft centre.

Figure 3 is a front and side view of the carbon segments of the commutator.

Figure 4 is a front and side view of the copper thimble.

Figure 5 is a front view of a flat spring joined with one of the copper shoes.

Referring to the drawings, 1 is the armature shaft of a machine, 2 is a metal frame that supports the commutator elements, 3 is a washer of insulating material such as "transite", 4 and 4' are the carbon segments of the commutator, 6 and 6' are the copper shoes that function as brushes, 7 shows the copper strips that form thimbles around the circular portion of the carbon segments. 8 is the armature winding or coils, 9 is the armature core, 10 shows the lead wires from the armature winding to the commutator segments, 11 and 11' are flat springs that hold the copper shoes in contact with the carbon segments, 12 shows the soldered connections to the thimbles In the construction of the prior art wherein a commutator made up of copper segments was employed the armature coils are momentarily short-circuited every time adjacent copper segments are bridged by the carbon brush; the resistance of the commutator segments is negligible and the current flowing in the short-circuited coil has an appreciable value. When however, the bridged segments are composed of carbon, the resistance of the circuit including the armature coil and the bridging brush is appreciably greater owing to the high specific resistance of carbon, hence the current flowing in the short-circuited coil is much lower in value, thus increasing the useful life of the segments by tending to reduce sparking at the moment the circuit including the bridging brush is opened by the continued rotation of the commutator segments, as well as increasing the useful life of the armature by decreasing the risk of burning out the armature coils.

The elimination of mica as an insulating medium between the commutator segments is also beneficial as the tendency for the mica to become embedded in the surface of the brush is avoided thereby eliminating pitting of the commutator segments and poor commutation arising from the presence of mica upon the contacting surface of the brush.

Having thus described my invention, I claim:

1. In a commutator for a dynamo-electric machine and in combination an insulating disc, and a plurality of segments of non-metallic conductive material secured in fixed relation to said disc to define a ring of electrically separated segments the separations between said segments constituting channels for the free passage of air when the commutator is rotated.

2. In a commutator construction and in combination a heat resisting insulating disc, a plurality of segments of non-metallic conductive material, and an equal number of metallic holders for individually securing said segments in fixed relation to said disc to define a ring of electrically separated segments the separations between said segments constituting channels through which the air is free to pass when the commutator is rotated.

3. A commutator comprising an insulating disk having a plurality of openings therethrough, a plurality of non-metallic conductive contact members, each having a shank portion and a head portion integral therewith, and a flanged metallic ferrule surrounding each shank portion and mounted within said openings to secure said contact members in fixed relation to said disk.

Signed at New York in the county of New York and State of New York this 25th day of October A. D. 1928.

CLYDE W. LANDERS.